(12) United States Patent
Chang et al.

(10) Patent No.: US 6,727,969 B2
(45) Date of Patent: Apr. 27, 2004

(54) LIQUID CRYSTAL DISPLAY PANEL

(75) Inventors: Wei-Chih Chang, Hsinchu (TW); Chung-Wen Lay, Hsinchu (TW)

(73) Assignee: Toppoly Optoelectronics Corporation, Hsinchu (TW)

( * ) Notice: Subject to any disclaimer, the term of this patent is extended or adjusted under 35 U.S.C. 154(b) by 0 days.

(21) Appl. No.: 10/308,643

(22) Filed: Dec. 3, 2002

(65) Prior Publication Data

US 2003/0133061 A1 Jul. 17, 2003

(30) Foreign Application Priority Data

Dec. 31, 2001 (TW) .......................... 90133494 A

(51) Int. Cl.[7] ............................................. G02F 1/1343
(52) U.S. Cl. .................... 349/143; 349/113; 349/158
(58) Field of Search ................................ 349/113, 114, 349/139, 143, 158

(56) References Cited

U.S. PATENT DOCUMENTS

| 6,195,140 | B1 | | 2/2001 | Kubo et al. ................ 349/44 |
| 6,441,873 | B2 | * | 8/2002 | Young ........................ 349/43 |
| 2001/0017679 | A1 | | 8/2001 | Ha et al. .................... 349/113 |
| 2002/0047970 | A1 | * | 4/2002 | Ono et al. .................. 349/122 |

\* cited by examiner

*Primary Examiner*—Tarifur R. Chowdhury
*Assistant Examiner*—Tai Duong
(74) *Attorney, Agent, or Firm*—Ladas & Parry

(57) ABSTRACT

The present invention discloses a LCD panel, including a first substrate, a second substrate, a liquid crystal layer installed in between the first substrate and the second substrate, a plurality of pixel electrodes, in which each pixel electrode contains a plurality of protruded blocks, in which each protruded block includes a first reflection layer installed over the surface of the second substrate and is in a shape of hollow arc with an opening over the center of the arc, and a second reflection layer embedded in the surface of the second substrate and installed right beneath the opening of the first reflection layer.

14 Claims, 4 Drawing Sheets

LIQUID CRYSTAL DISPLAY PANEL

BACKGROUND OF THE INVENTION

1. Field of the Invention

The invention relates to a liquid crystal display (LCD) panel, in particular to a LCD panel capable of enhancing a light utilization and penetration.

2. Description of Related Art

The conventional penetration LCD panel 10 includes a first substrate 11, a second substrate 12, a liquid crystal layer 13, a first polarizer 16, a second polarizer 17 and a plurality of pixel electrodes in which each pixel electrode contains a reflection area 14 and a penetration area 15 as shown in FIG. 1. An incident light of a back light source 18 passes through the LCD panel 10 to hereby display the picture recognizable by naked eyes. The path of the incident light into the liquid crystal layer 13 of the back light source 18 can be expressed by paths a, a' and a path b. Although part of the incident lights can directly penetrates by passing through area 15 as shown in path b. However, when incident lights are beneath the reflection area 14, a small portion of those will penetrate by passing through an area 15 as a result of the reflection area 14 and the reflection effect of the back light source 18, while they will be weakened due to the absorption of the second polarizer 17 in reflection process as shown in path a. Moreover, most of the incident lights under the reflection area 14 are exhausted due to the obstruction of the reflection area 14 or the absorption of the second polarizer 17 as shown in path a'. In general, the penetration rate of conventional half penetration LCD panels 10 is about 25%. A U.S. Pat. No. 6,195,140 discloses a LCD panel 20 providing a first substrate 21, a second substrate 22, a liquid crystal layer 23, a reflection area 24 with uneven surface and a penetration area 25 as shown in FIG. 2, while it is not significant to improve the utilization efficiency of surrounding light sources and back light source.

In addition, U.S. Patent Publication No. 2001/0017679A1 discloses a LCD panel 30, in which a reflection layer 39 is installed under a second polarizer 37 so that the incident light of the back light source 38 can further reflect, making it capable of passing through the penetration area 35 without being directly blocked by the reflection area 34 or absorbed by the second polarizer 37 as shown in path c. Inevitably, part of light sources are consumed by the obstruction of the reflection area 34 as shown in path d and as it is necessary to further coat a reflection layer 39 under the polarizer 37, an alignment defect and so on resulted in the production process make the manufacturing process more uncontrollable.

SUMMARY OF THE INVENTION

The goal of the invention provides a LCD panel with a higher light efficiency so that the penetration rate increases but its reflection rate won't be reduced.

To achieve the above goal and avoid the disadvantages of the conventional techniques, the invention discloses a LCD panel, including a first substrate, a second substrate, a liquid crystal layer installed in between the first substrate and the second substrate, a plurality of pixel electrodes, in which each pixel electrode contains a plurality of protruded blocks, in which each protruded block includes a first reflection layer installed over the surface of the second substrate and is in a shape of hollow arc with an opening over the center of the arc, and a second reflection layer embedded in the surface of the second substrate and installed right beneath the opening of the first reflection layer.

As such, the incident light of the back light source can pass through the opening of the first reflection layer by utilizing double reflection effects, making the originally blocked incident light by reflection layer once again become a penetrating light to increase the light utilization.

BRIEF DESCRIPTION OF THE DRAWINGS

The present invention will be described according to the appended drawings in which.

DETAILED DESCRIPTION OF THE INVENTION

Figure 1:
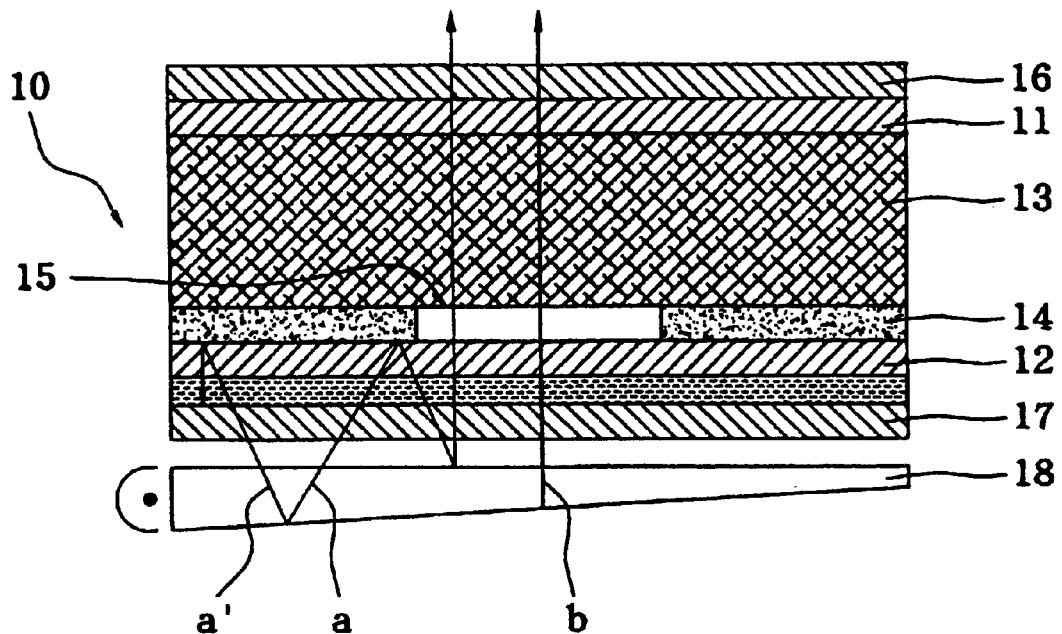
FIG. 1 shows a cross sectional view of prior LCD panels.
Figure 2:
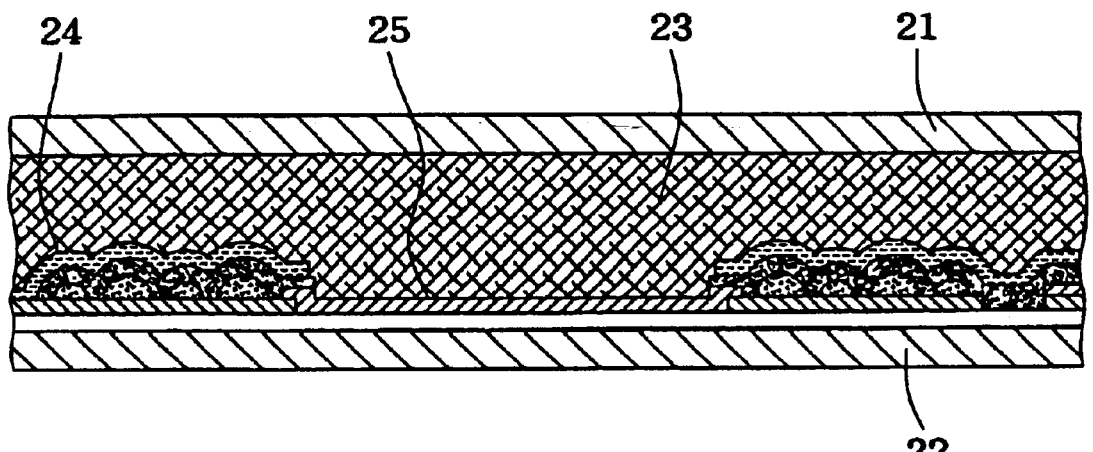
FIG. 2 shows another cross sectional view of prior LCD panels.
Figure 3:
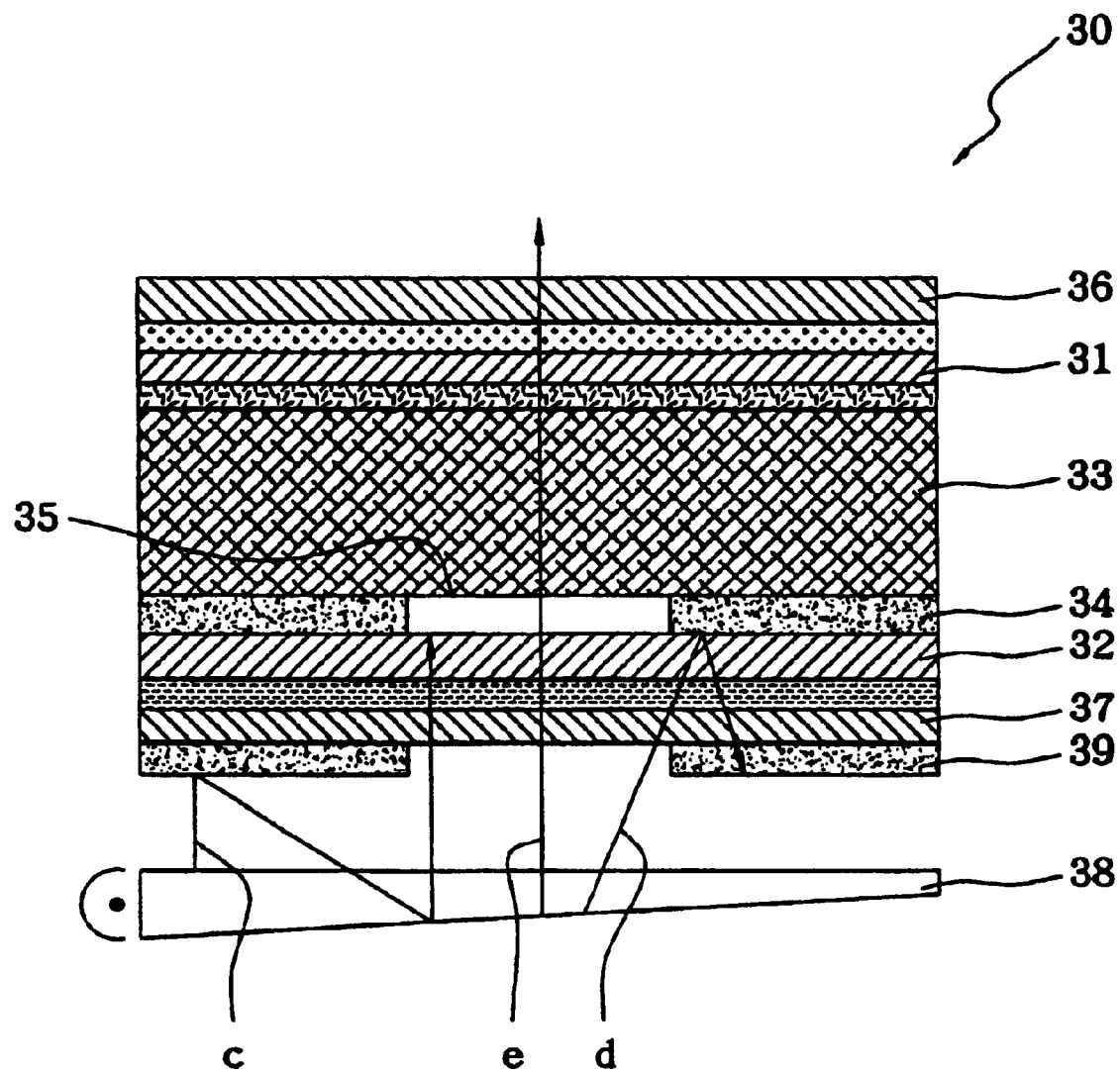
FIG. 3 shows another cross sectional view of prior LCD panels.
Figure 4:
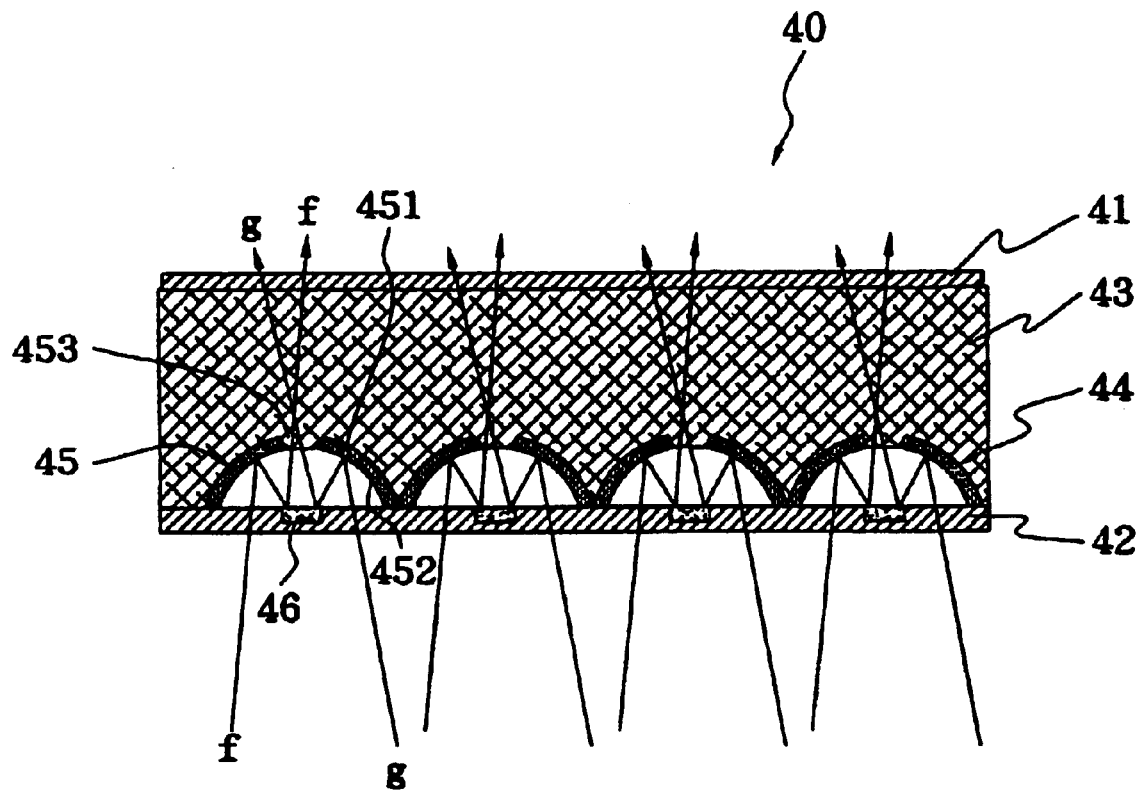
FIG. 4 shows a cross sectional view of a LCD panel of one embodiment according to the present invention.

FIG. 4 shows a cross sectional view of a LCD panel of one embodiment according to the present invention, including a first substrate 41, a second substrate 42, a liquid crystal layer 43 and a plurality of pixel electrodes (not shown). The liquid crystal layer 43 is installed in between the first substrate 41 and the second substrate 42 and each pixel electrode comprises a plurality of protruded blocks 44.

Each protruded block 44 contains a first reflection layer 45 and a second reflection layer 46. The first reflection layer 45 is installed on top of the surface of the second substrate 42 and is in a shape of an arc with an opening 453 over the arc center. The first reflection layer 45 provides a first surface 451 and a second surface 452, in which the first surface 451 is used to reflect surrounding light sources while the second surface 452 is used to reflect the incident light sources. The second reflection layer 46 is embedded in the surface of the second substrate 42 and is under the opening 453 of the first reflection layer 45. The first reflection layer 45 and the second reflection layer 46 are made from the materials with conductivity and high reflection rate, which can be chosen from the following groups, aluminum, silver, gold, neodymium and their alloy. The opening 453 of the first reflection layer 45 and the shape of the second reflection layer 46 are not subject to any rule. The better one is in shapes of rectangular, circular or square. Furthermore, the surfaces of the first reflection layer 45 and the second reflection layer 46 are smooth planes or concaved planes to facilitate the reflection or focusing.

Figure 5:
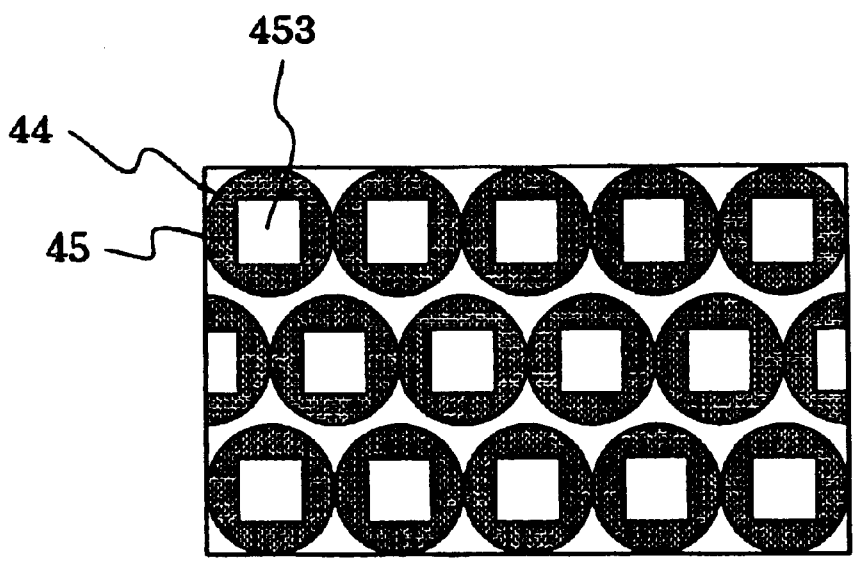
FIG. 5 shows a top view of a LCD panel of one embodiment according to the present invention.

FIG. 5 shows a top view of a LCD panel of one embodiment according to the present invention, which uses the opening 453 of each protruded block 44 as the penetration area, thus the incident light from the back light source can penetrate through opening 453 and the drawback of lower light utilization in prior arts as a result of obstruction of reflection layer can be avoided.

Figure 6:
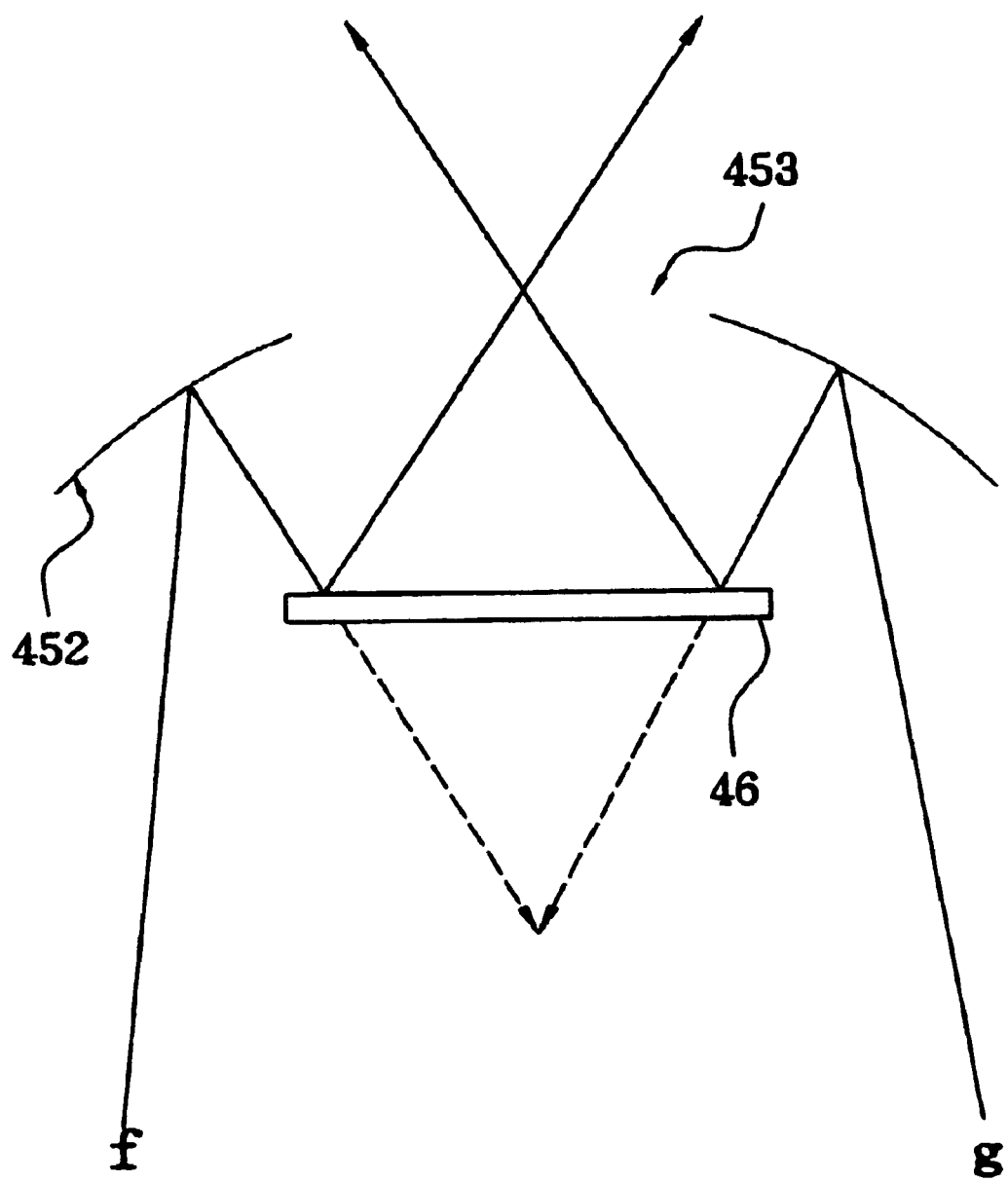
FIG. 6 shows a hint diagram of a reflection theorem of LCD panels according to the present invention.

FIG. 6 shows a hint diagram of a reflection theorem of LCD panels according to the present invention. The incident light from back light source penetrates the opening 453 of the first reflection layer 45 by means of double reflections.

As far as the paths f and g are concerned, the incident light from the back light source will go through the second surface 452 of the first reflection layer 45 for the first reflection to the surface of the second reflection layer 46 and go through the second reflection layer 46 for the second reflection penetrating through the opening 453. Therefore, the incident light consumed by the obstruction of the reflection area in prior arts can be further reflected to form a penetration light. The penetration rate of the present invention can be achieved by three times of prior art.

The penetration rate of the invention can be controlled with the arc of the first reflection layer 45, a distance between the second reflection layer 45 and the opening 453 and the size of the second reflection layer 45 and the opening 453. For this, it is not subject to any limitation in the invention.

In one embodiment of the invention, the distance between the opening 453 of the first reflection layer 45 and the second reflection layer 46 is located at about ⅓ to ⅔ of the focal length of the first reflection layer 45 and is better yet located at ½ focal length of it. In addition, the width of the opening 453 of the first reflection layer 45 and the width of the second reflection layer 46 can be roughly set up as the same. The widths of the opening 453 and the second reflection layer 46 are in between ⅓ to ⅔ the radius of the first reflection layer 45 and are better yet ½ the radius of the reflection layer 45.

The above-described embodiments of the present invention are intended to be illustratedive only. Numerous alternative embodiments may be devised by those skilled in the art without departing from the scope of the following claims.

What is claimed is:

1. A liquid crystal display panel, comprising:
   a first substrate;
   a second substrate;
   a liquid crystal layer installed between said first substrate and said second substrate; and
   a plurality of pixel electrodes installed on a surface of said second substrate, said pixel electrodes comprising a plurality of protruded blocks, and each of said protruded blocks including:
   (a) a first reflection layer installed over a surface of said second substrate, and a central position of said first reflection layer having an opening; and
   (b) a second reflection layer installed on a surface of said second substrate and beneath said opening of said first reflection layer.

2. The liquid crystal display panel of claim 1, wherein a material of said first reflection layer is selected from the group essentially consisting of aluminum, silver, gold, neodymium and their alloy thereof.

3. The liquid crystal display panel of claim 1, wherein a material of said second reflection layer is selected from the group essentially consisting of aluminum, silver, gold, neodymium and their alloy thereof.

4. The liquid crystal display panel of claim 1, wherein said first reflection layer is in an arc shape.

5. The liquid crystal display panel of claim 1, wherein said second reflection layer is in a shape of rectangular, circular or square.

6. The liquid crystal display panel of claim 1, wherein said second reflection layer is a smooth plane or a concave plane.

7. The liquid crystal display panel of claim 1, wherein said opening of said first reflection layer is in a shape of rectangular, circular or square.

8. The liquid crystal display panel of claim 1, wherein said second reflection layer is located at one half of a focal length of said first reflection layer.

9. The liquid crystal display panel of claim 1, wherein a width of said opening of said first reflection layer is approximately equal to a width of said second reflection layer.

10. The liquid crystal display panel of claim 1, wherein a width of said opening of said first reflection layer is in between one third to two third radius of said first reflection layer.

11. The liquid crystal display panel of claim 1, wherein a width of said opening of said first reflection layer is approximately equal to one half radius of said first reflection layer.

12. The liquid crystal display panel of claim 1, wherein a width of said opening of said second reflection layer is in between one third to two third radius of said first reflection layer.

13. The liquid crystal display panel of claim 1, wherein a width of said opening of said second reflection layer is approximately equal to one half radius of said first reflection layer.

14. The liquid crystal display panel of claim 1, wherein said second reflection layer is embedded in a surface of said second substrate.

* * * * *